United States Patent [19]
Satoh

[11] Patent Number: 5,825,992
[45] Date of Patent: Oct. 20, 1998

[54] FACSIMILE DEVICE

[75] Inventor: Kazuhiro Satoh, Hiratsuka, Japan

[73] Assignee: Ricoh Company, Ltd., Tokyo, Japan

[21] Appl. No.: 658,441

[22] Filed: Jun. 10, 1996

[30] Foreign Application Priority Data

Jun. 9, 1995 [JP] Japan .................................... 7-143210

[51] Int. Cl.$^6$ ........................................................ H04N 1/32
[52] U.S. Cl. ............................ 395/115; 358/404; 358/444
[58] Field of Search ..................................... 358/404, 444, 358/468; 395/115, 116; 399/82–85; H04N 1/333, 1/32

[56] References Cited

U.S. PATENT DOCUMENTS

| | | | |
|---|---|---|---|
| 4,907,094 | 3/1990 | Mishima et al. | 358/404 |
| 5,359,429 | 10/1994 | Takahashi | 358/404 |
| 5,483,353 | 1/1996 | Kudou | 358/404 |

*Primary Examiner*—Kim Yen Vu
*Attorney, Agent, or Firm*—Oblon, Spivak, McClelland, Maier & Neustadt, P.C.

[57] ABSTRACT

A facsimile device operable in either a memory receiving mode or direct receiving mode. When the device is put in a memory receiving mode after previous memory receiving, the image information transmitted next time is directly received, and thereby the repetition of the memory receiving mode and the retransmission of information can be eliminated and the convenience of memory receiving can be improved. A facsimile control portion detects a memory remaining amount of the image information memory available storing image information. When the absence of a memory remaining amount is detected, the occurrence of a memory over (operation in the memory receiving mode) is stored in the system memory. When the calling arrival occurs, the document is memory-received or directly received on the basis of the presence or absence of the memory over occurrence stored in the system memory.

3 Claims, 6 Drawing Sheets

FACSIMILE DEVICE

BACKGROUND OF THE INVENTION

1. Field of the Invention

The present invention relates to a facsimile device provided with a memory signal receiving function and a direct signal receiving function, in particular, a facsimile device in which the signal receiving mode is controlled in accordance with the receiving state at the preceding memory signal receiving.

2. Description of the Related Arts

Conventionally, the facsimile device for transmitting and receiving image information read out from the manuscript document image through a communication circuit is well known. In recent years, the facsimile device provided not only with the so-called direct signal receiving function of directly recording and outputting the received image information as it is, but also the so-called memory signal receiving function of recording and outputting the received image information after storing the image information for a while in a memory, has come into wide use.

Such a facsimile device has an image information memory for storing the transmitted image information. The same can shorten the communication time, and record and output the image information with the desired form by the memory signal-receiving before recording and outputting.

Furthermore, the published specification of Japanese Laid-open Patent Publication No. 62-241466/1987 describes a facsimile device in which, when it is impossible to output the recording information, the image information to be transmitted is temporarily stored in the memory (memory-receiving function) and thereafter the image information is transmitted to the corresponding partner previously set. Namely, such facsimile device is devised so as to be able to receive always the image information. Hereinafter, this device is called the first prior-art device.

And further, the published specification of Japanese Laid-open Patent Publication No. 63-222572/1988 describes a facsimile device, in which the residual amount in the memory at the receiver side is notified to the transmitter side, and thereby an operator can recognize the number of the remaining paper sheets capable of being memory-received. Hereinafter, this device is called the second prior-art device.

However, in such conventional facsimile device, when a large volume of image information carried on many sheets of the manuscript document is transmitted (received), for instance, at the time of memory-receiving, even though 100% of the image information memory capacitance can be used, it is impossible to receive all of the information stored in the memory.

At this time, an error message is notified to the transmitter side on the half way and the remaining information not transmitted is retransmitted (further transmitted again).

For this reason, there arises a problem to be solved that, until all of the image information is normally received, notification of the error and retransmission processing have to be repeated. Moreover, such problem occurs even on the occasion that the image information not recorded and not outputted is stored in the image information memory and the memory remaining-amount becomes small.

Furthermore, in the first prior-art device, since only the received image information is transmitted, the above-mentioned problem occurs for the device itself and for the correspondence partner.

And further, in the second prior-art device, since the memory remaining-amount at the receiver side is notified to the transmitter side, it is possible to prevent the retransmission due to the error during one communication. However, in order to prevent the above, it is necessary to adjust the amount of the information to be transmitted one time by the operator and thereby the utilization state thereof becomes worse. In addition, the information of the memory remaining-amount has to be transmitted and received between the transmitter side and the receiver side. If both of them have the same function as mentioned above, it is impossible to execute the transmitting/receiving operation.

SUMMARY OF THE INVENTION

Accordingly, a first object of the present invention is to eliminate the repetition of memory over and retransmission and improve the convenience at the time of the memory receiving, by performing the direct receiving for the image information transmitted next time when the memory over occurs at the time of the previous memory receiving Further objects of the present invention are to promote effective utilization of the memory receiving function and thereby further improve the convenience even though the memory over occurs, by performing the memory receiving when the image information received after the memory over occurs at the time of the previous memory receiving goes out of the predetermined condition.

Another object of the present invention furthermore is to prevent the occurrence of error due to memory over by directly receiving the image information transmitted in accordance with the remaining amount of memory and to improve the convenience at the time of the memory receiving.

Another object of the present invention is to provide a facsimile device capable of eliminating the memory over and the re-transmission in order to improve the convenience at the memory receiving.

Still another object of the present invention is to provide a facsimile device capable of effectively utilizing the memory receiving function even though the memory over occurs.

Still another object of the present invention is to provide a facsimile device capable of preventing the occurrence of error due to the memory over.

In order to attain the above-mentioned objects, according to a first aspect of the present invention there is provided a facsimile device including an image information memory for storing an image information and which receives the transmitted image information by use of the method of memory receiving or direct receiving, the above facsimile device including: a remaining amount detecting medium for detecting a remaining amount of memory available for data storage in the aforementioned image information memory, a remaining amount absence detecting medium for detecting the absence of a memory remaining amount of the image information memory on the basis of the detected information, an information keeping medium for storing the detected information, and a receipt controlling medium for controlling the memory receipt or direct receipt of the transmitted image information.

According to a second aspect of the present invention, there is further provided a time measuring medium for measuring the elapsed time from the moment of detecting the absence of a remaining memory amount by use of the aforementioned remaining amount absence detecting medium and a time comparing medium for comparing an elapsed time with the predetermined time information, and the aforementioned receipt controlling medium is constructed so as to receive the image information transmitted on the basis of the comparison result in either a memory receiving mode or a direct receiving mode.

According to a third aspect of to the present invention, in addition to the first aspect, there is further provided a transmission source discriminating medium for discriminating a transmission source of the transmitted image information, an information storing medium for storing therein information on the transmission source transmitting the image information at the time of detecting the memory amount absence by use of the afore-mentioned remaining amount absence detecting medium, and an information comparing medium for comparing the discrimination medium for discriminating the transmission source of the image information with the stored information of the information storing medium, and the afore-mentioned receipt controlling medium is constructed so as to receive the image information transmitted on the basis of the result of the above comparison by use of the method of memory receiving or direct receiving.

According to a fourth aspect of the present invention there is provided a facsimile device including an image information memory for storing therein the image information and receiving the transmitted image information by use of the method of memory receiving or direct receiving, including, a remaining amount detecting medium for detecting the memory remaining amount capable of storing the image information memory, a remaining amount comparing medium for comparing the detected memory remaining amount with a previously set threshold value, and a receipt controlling medium for receiving the transmitted image information by use of the method of memory receiving or direct receiving on the basis of the above comparison result.

According to the first aspect of the present invention, the absence of the memory remaining amount is detected by the remaining amount absence detecting medium from the detection information regarding the memory remaining amount of the image information memory detected by the remaining amount detecting medium, and the detected information is held by the information holding medium.

Further, the transmitted image information is received on condition that receiving is controlled to be in the memory receiving mode or the direct receiving mode by the receipt controlling medium on the basis of information held by the information holding medium, and thereafter the image information thus controlled is received. Consequently, even though the image information previously transmitted when the receiver was in a state of memory over is transmitted again, the image information is directly received and there occurs no memory over again.

According to the second aspect, the elapsed time since the remaining amount absence detecting medium starts to detect the absence of the memory remaining amount is measured by the time measuring medium, and the measured elapsed time is compared with the previously set time information by the time comparing medium. Then, the transmitted image information is received in a state of the receiving mode controlled to the memory receiving or direct receiving by the receipt controlled medium on the basis of the result of the comparison performed by the time comparing medium. Consequently, in consideration of the time period from the start of the remaining amount absence detection till the retransmission of the memory-over image information, the time information is previously set and thereby the image information can be received by the method of memory receiving after the retransmitted image information is directly received and the elapsing time exceeds the predetermined time.

According to the third aspect, in case that the remaining amount absence detecting medium detects the absence of the remaining amount, the information of the transmission source regarding the image information discriminated by the transmission source discriminating medium is stored in the information storing medium. Further, when the image information is transmitted, the transmission source information is compared with the information stored in the information storing medium by the information comparing medium. The information thus compared is received in the memory receiving mode or the direct receiving mode under control of the receipt controlling medium on the basis of the result of the comparison performed by the information comparing medium. Consequently, the image information transmitted in a state of memory over is directly received while avoiding repeat memory-over, and the other image information is received with the previously set receiving mode.

Accordingly to the fourth aspect, the memory remaining amount in the image information is detected by the remaining amount detecting medium, and the detected information is compared with the previously set threshold value by the remaining amount comparing medium. Then, the transmitted image information is received in either the memory receiving mode or the direct receiving mode under control by the receipt controlling medium on the basis of the comparison result of the remaining amount comparison medium. Consequently, the image information is received in the memory receiving mode or in the direct receiving mode in accordance with the memory remaining amount without causing the memory-over state.

BRIEF DESCRIPTION OF THE DRAWINGS

A more complete appreciation of the present invention and many of the attendant advantages thereof will be readily attained as the same becomes better understood by reference to the following detailed description when considered in connection with the accompanying drawings, wherein.

DETAILED DESCRIPTION OF THE PREFERRED EMBODIMENTS

Figure 1:
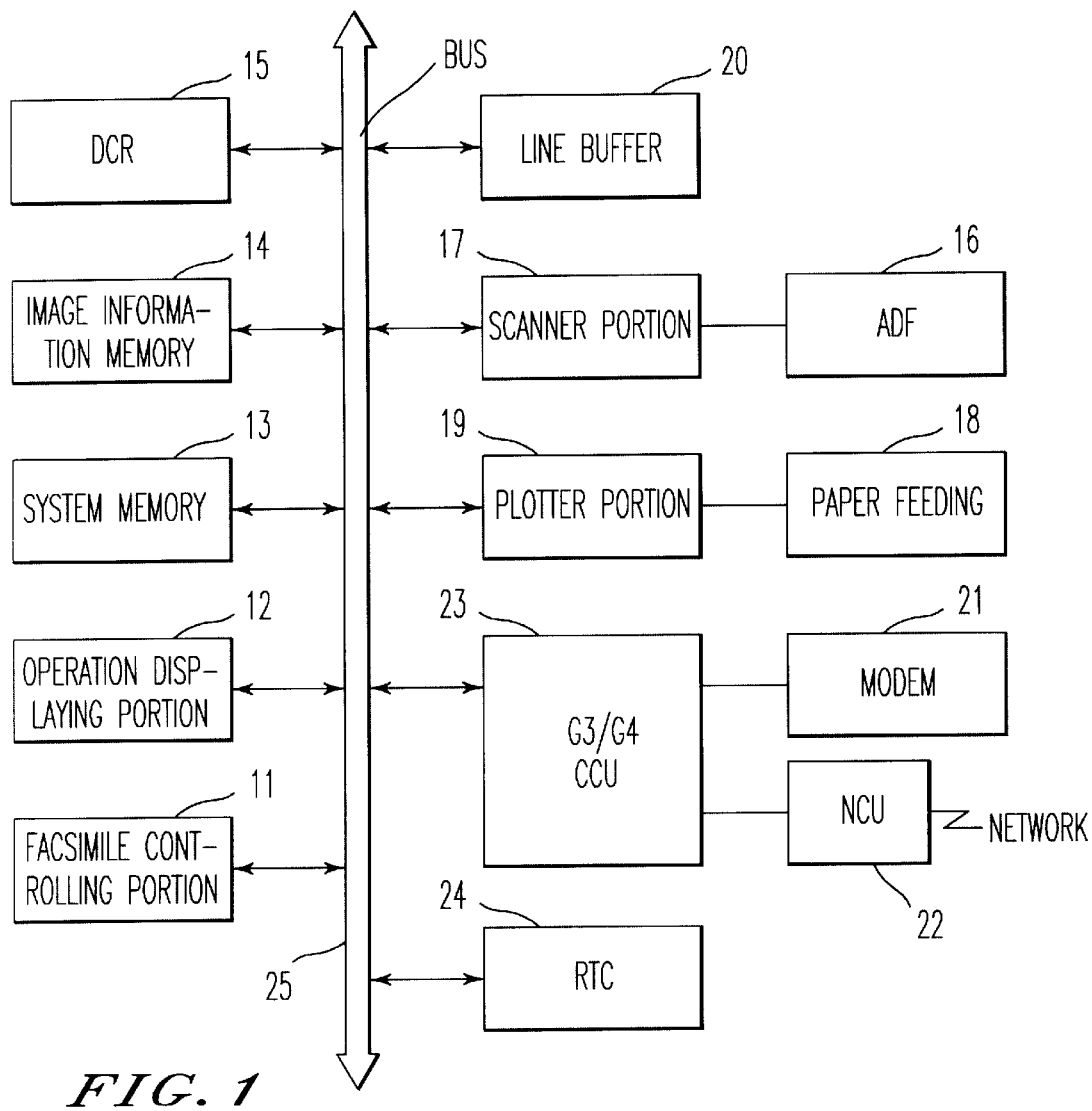
FIG. 1 is a block diagram showing an overall construction of an embodiment of facsimile device according to the present invention.
Figure 2:
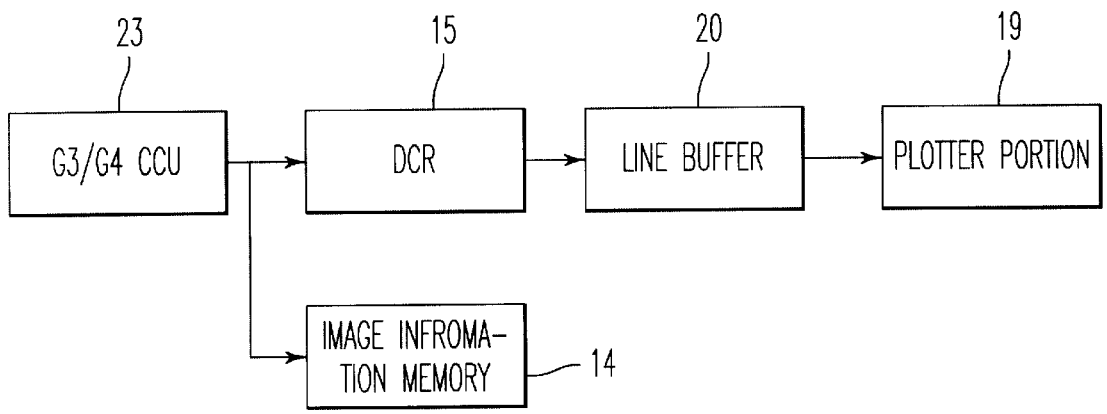
FIG. 2 is an explanatory diagram for explaining the processing of the image information by use of the direct receiving method.
Figure 3:
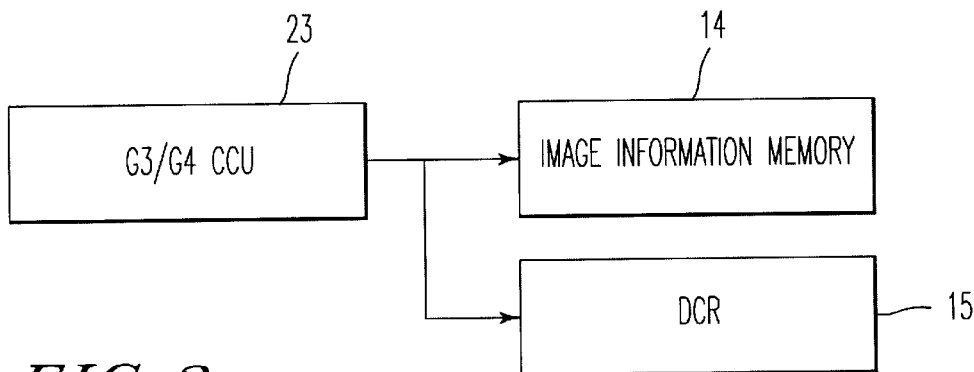
FIG. 3 is an explanatory diagram for explaining the processing of the image information by use of the memory receiving method.

Referring now to the drawings, wherein like reference numerals designate identical or corresponding parts throughout the several views, and more particularly to FIGS. 1–3 thereof, FIGS. 1 through 3 are block diagrams showing an embodiment of the facsimile device relating to the present invention. First, the construction thereof is explained.

In FIG. 1 the reference numeral 11 represents a facsimile control portion. The control portion 11 generally controls the respective portions of the facsimile device in accordance with a control program previously set in the internal memory (ROM) and performs the operations of transmitting and receiving the document image information between the facsimile device itself and a communication partner by means of the facsimile communication.

The facsimile control portion 11 is connected, through the bus 25, to:

- a system memory 13 for storing data such as parameters, registering data, control data, etc. necessary at the time of executing the above-mentioned control program,
- an image information memory 14 for storing the image information at the time of practicing the memory transmitting or receiving,
- a DCR (coding/decoding portion) 15 for coding the image information to be transmitted by compressing that or decoding the received coded image information by expanding that,
- a scanner portion 17 for reading out the image information of the transmitted document from the manuscript conveyed by an ADF (automatic manuscript feeder) 16,
- a plotter portion 19 for recording the image information received on the recording paper fed by the paper feeding apparatus 18 and outputting the recorded paper therefrom,
- a line buffer 20 for processing and transferring the image information from the scanner 17 or the image information to the plotter 19 per a line unit,
- a G3/G4 CCU (communication control portion) 23 which is connected to the network control portion 21 for performing automatically the operations of transmitting/receiving the signal and the MODEM 22 for modulating and demodulating the image information, and controls the communication through the circuit network connected to a network controlling portion 21 in accordance with the transmission controlling procedure of the G3/G4 facsimile, and an RTC (real time clock) 24 for counting the time.

In such a facsimile device, an NCU 22 detects receiving of the signal and a G3/G4 CCU 23 (hereinafter, simply called CCU 23) notifies the above fact to the facsimile control portion 11. The facsimile control portion 11 performs the selection of the receiving mode, that is, the selection of the direct receiving mode of directly recording and outputting the image information transmitted after the signal arrival by use of the plotter portion 19, or the memory receiving mode of temporarily storing the image information into the image information memory 14, transferring the stored image information to the plotter portion 19, and recording and outputting the transferred image information. Hereupon, the facsimile device is provided with the following function of memory receiving:

1) Recording/Outputting Function of temporarily storing the received image information in the image information memory 14 and simply recording and outputting the image information after finishing the signal receiving;

2) Multiple Number of Copies Outputting Function of temporarily storing the received image information in the image information memory 14 and recording the previously set number of copies after finishing the signal receiving; and 3) Transferring Function of temporarily storing the received image information in the image information memory 14 and transferring the document (image information) to the communication partner previously registered in the system memory 13 after finishing the signal receiving.

4) Intol Receiving Function of temporarily storing the received image information in the image information memory 14 and putting the information in a sheet of the recording paper in accordance with the length (volume) of the document after finishing the signal receiving, for instance, recording and outputting two sheets of A-5 size document in a sheet of A-4 size recording paper.

5) Rotatively Receiving Function of temporarily storing the received image information in the image information memory 14 and rotating the document image information by 90° and recording and outputting the rotated information on the recording paper after finishing the signal receiving, for instance, recording and outputting the document image information to be recorded and outputted on the A4-size recording paper put horizontally, on the same A4-size recording paper put vertically.

6) Receiving-side Size-reducing Function of temporarily storing the received image information in the image information memory 14 and size-reducing, recording, and outputting the document (image information) after finishing the signal receiving, for instance, recording and outputting the document of B4-size on the A4-size recording paper. Furthermore, the control portion 11 of the facsimile device determines the receiving mode to either one of the direct receiving mode and the memory receiving mode for the transmitted document (image information) in accordance with the previously set receiving function. In such situation, when the aforementioned memory receiving function is selected, all of the arriving information is received in the memory receiving method. However, when the memory receiving function cannot be utilized (including the selection of the directly receiving function), the arriving information is directly received.

Further, at the time of directly receiving the information, after the received image information from CCU 23 is decoded by DCR 15, the decoded information is transferred to the plotter portion 19 through the line buffer 20 and recorded and outputted onto the recording paper, as shown in FIG. 2.

At this time, in order to prevent the information from disappearing due to error (paper absence/jamming) of the plotter portion 19, the image information from CCU 23 is stored in the image information memory 14 for the purpose of back-up, and the information disappears from the image information memory 14 per each output, after normally recording and outputting the information by use of the plotter portion 19. Further, at the time of memory-receiving of the information, the received image information from CCU 23 judges whether there exists a line error therein, by means of the error judgment of DCR 15, and stores the judged result in the image information memory 14. The image information stored in the image information memory 14 is read out after finishing the signal receiving. Thereafter, as in the case of direct receiving, the readout information is recorded and outputted by the plotter portion 19 through DCR 15 and the line buffer 20.

Next, the first embodiment relating to the first, second, or fourth aspects is described.

At first, the operation thereof is explained, hereinafter, referring to the flow charts respectively shown in FIG. 4 and FIG. 5.

Figure 4:
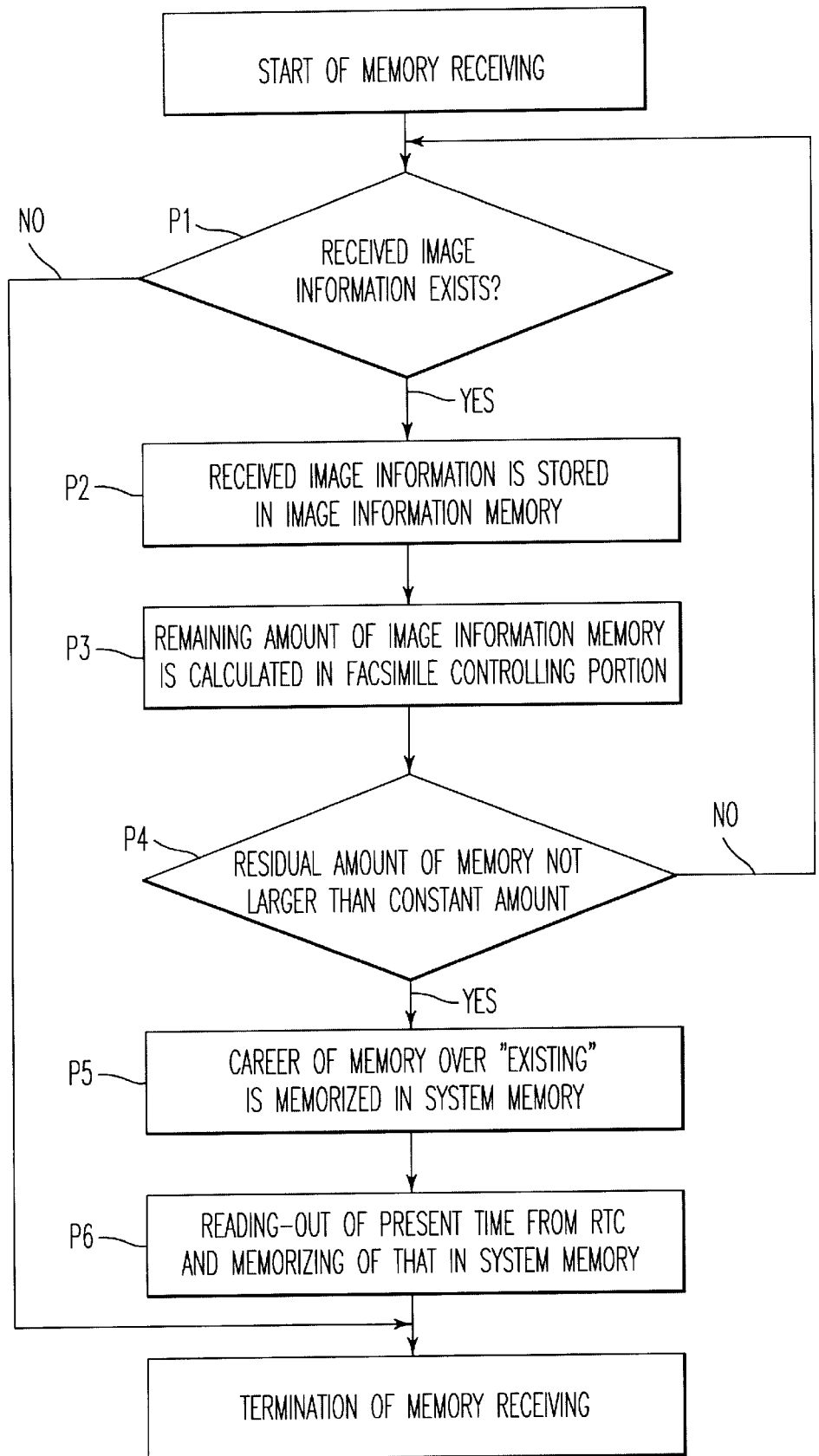
FIG. 4 is a flow chart for explaining the operation of a first embodiment according to the present invention.

In the device of FIG. 1, in case that there exists some image information not received during the time period of memory receiving (step P1) as shown in FIG. 4, the facsimile control portion 11 receives the image information not received and stores the received information in the image information memory 14 (step P2). At the same times the using amount of the image information memory 14 is calculated and thereby the memory residual amount can be determined. Then, the amount thus obtained is stored in the system memory 13 (step P3). Until the memory residual amount becomes not larger than a constant value, the procedure returns to the step P1 and continues the operation of memory receiving. However, in case that the image information of the transmitted documents is bulky and larger than the remaining amount of the image information memory 14, and thereby the state of memory over is detected, the command of interrupting the receiving operation is notified to the CCU 23. After both of the occurrence of memory over and the time of its occurrence are read out and stored in the system memory 13, the received image information stored in the image information memory 14 is read out, and the read-out information is recorded and outputted therefrom.

Figure 5:
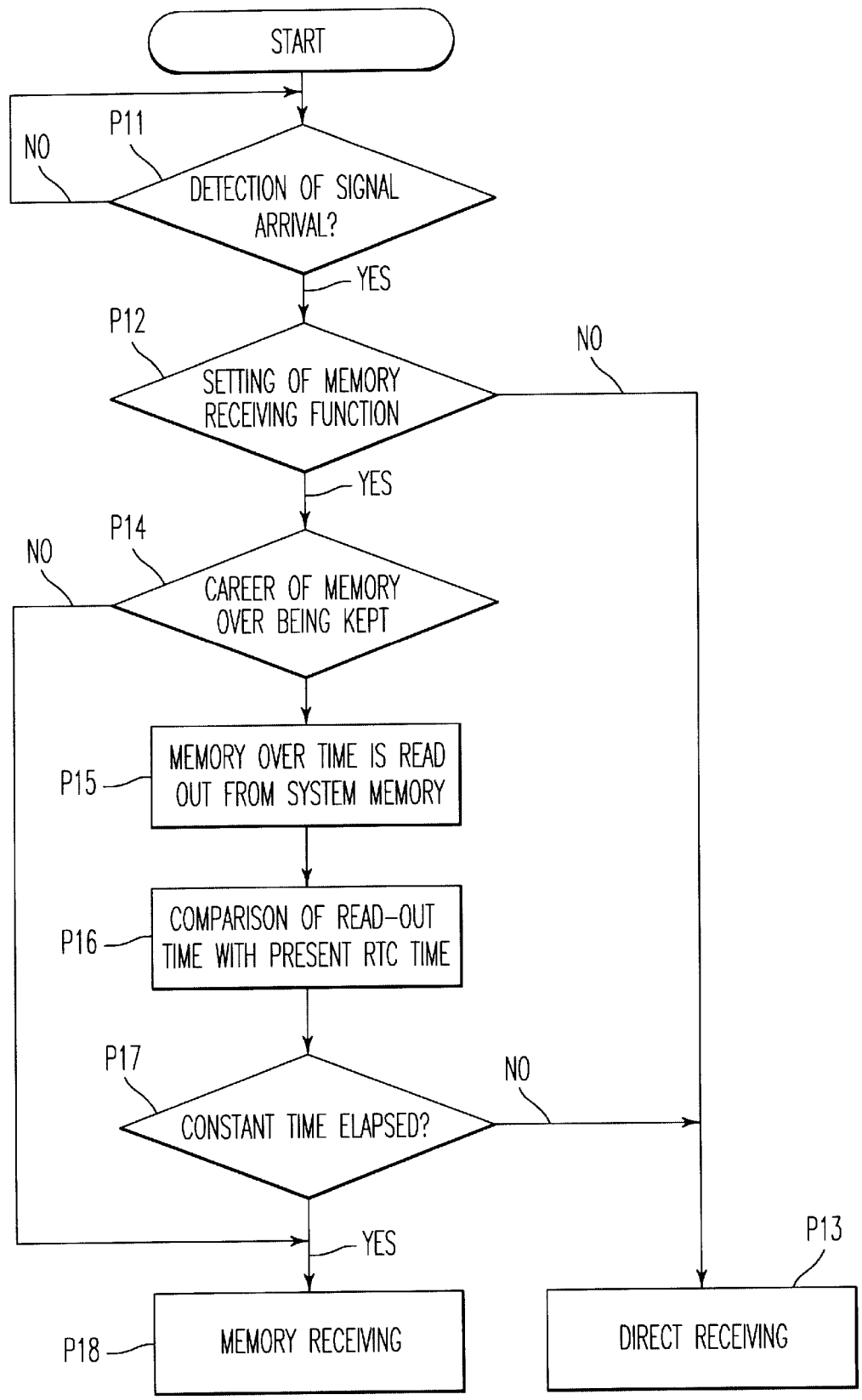
FIG. 5 is a flow chart for explaining one example of the processing step in FIG. 4.

And further, as shown in FIG. 5, in case that the above-mentioned memory receiving function is not selected (step P12) when the detection of the calling arrival by NCU 22 is notified through CCU 23 (step P11), the facsimile control portion 11 executes the direct receiving as it is (step P13) On the other hand, in case that the aforementioned memory receiving function is selected (step P12) and the occurrence of the memory over is stored (kept) in the system memory 13 (step P14), the occurrence time of the memory over is read out from the system memory 13 (step P15), and the read-out occurrence time is compared with the time measured at present by RTC 24 (step P16). When the occurrence time of the memory over does not elapse by a previously set constant time, for instance, five minutes, the selected memory receiving function is ignored and the direct receiving is performed (step P13). On the other hand, when the occurrence time of the memory over elapses by the above-mentioned previously set constant time, since the operation of recording and outputting of the received image information in the image information memory 14 has been already finished, the occurrence of the memory over and the occurrence time of the same in the system memory 13 is cleared, and at the same time memory receiving of the incoming image information is executed (step P18).

Furthermore, regarding the facsimile control portion 11, the threshold value of the memory remaining amount on the image information memory 14 (for instance, 25% of entire memory) is set in the system memory 13. When the detection of the calling arrival by NCU 22 is notified to the facsimile control portion 11 through CCU 23, the calculated memory remaining amount is read out from the system memory 13 together with the threshold value thereof and the former is compared with the latter. When the memory remaining amount is not smaller than 25%, the execution of memory receiving is allowed, on the contrary, when the memory remaining amount is smaller than 25%, the selected function is ignored and the direct receiving is executed.

Namely, the system memory 13 constructs an information holding medium, and the RTC 24 constructs a time counting medium, and further, the facsimile control portion 11 constructs a remaining amount detecting medium, a remaining amount absence detecting medium, and a receipt controlling medium. Further, a time comparing medium and a remaining amount comparing medium are provided within the facsimile control portion 11.

Figure 6:
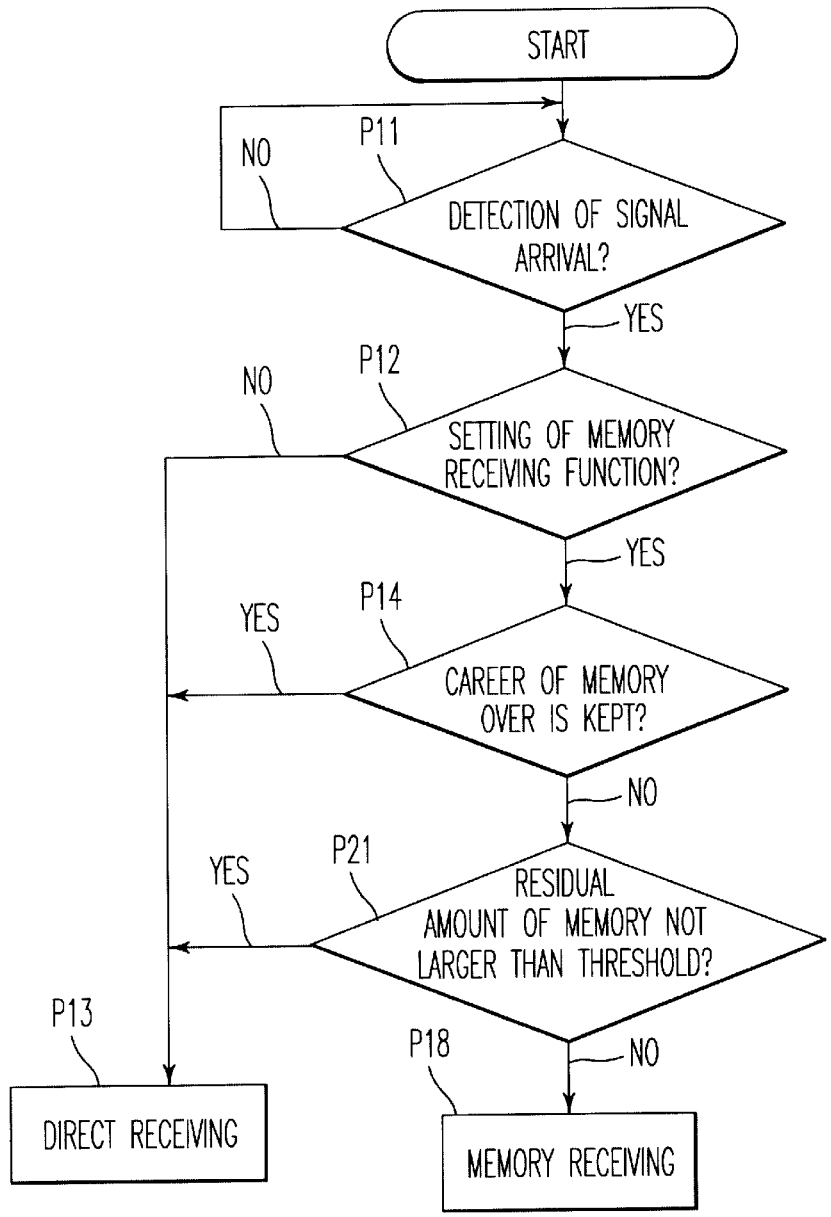
FIG. 6 is a flow chart for explaining the functioning the processing step shown in FIG. 5.
Figure 7:
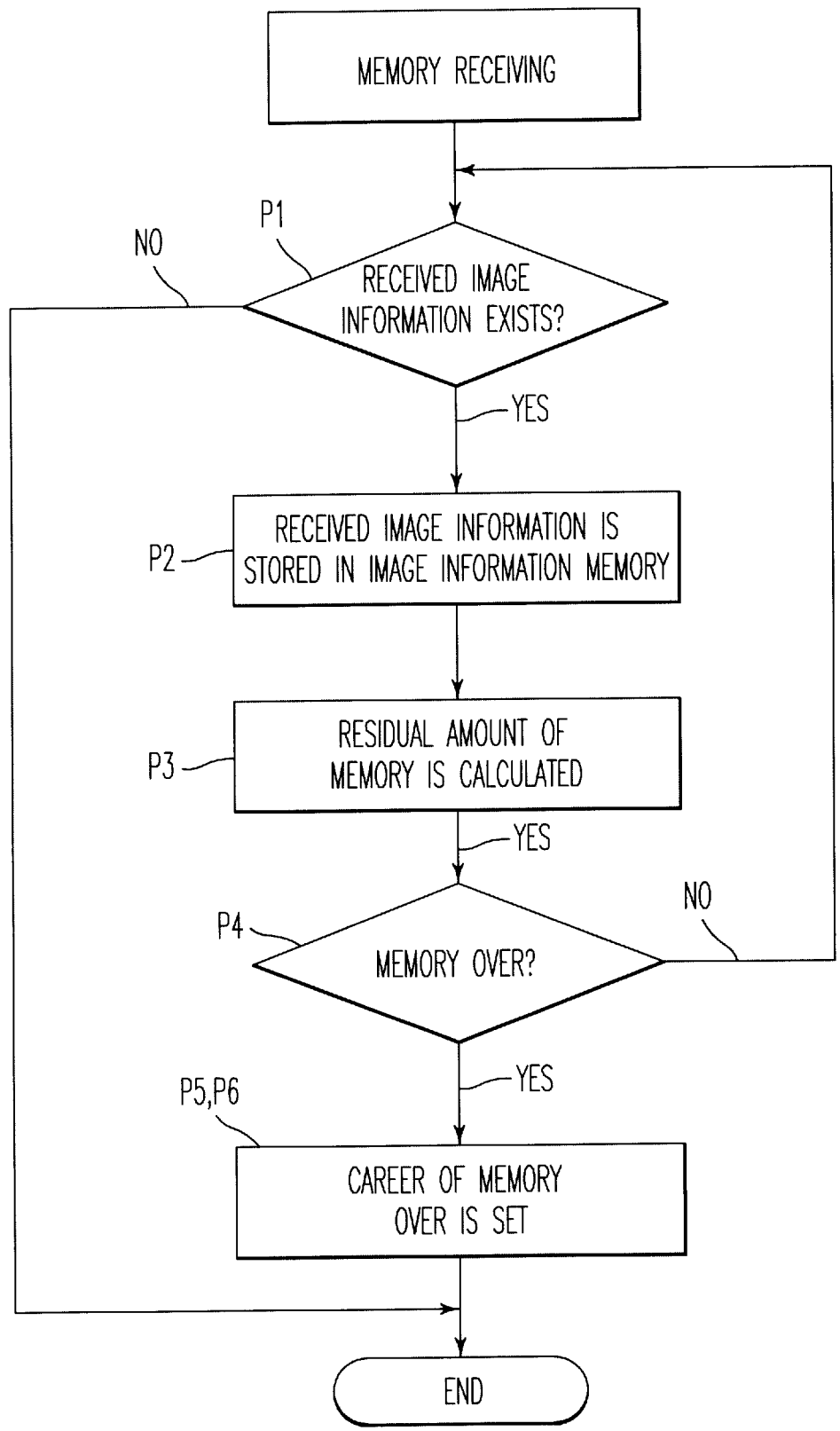
FIG. 7 is a flow chart for explaining a step in FIG. 6.

Next, the function thereof is explained referring to the flow charts respectively shown in FIG. 6 and FIG. 7. The same process steps illustrated in FIG. 4 and FIG. 5 are explained with the same step numbers.

At first, when the electric power source is turned on, the initial setting is done and thereby the memory over occurrence in the system memory 13 and the occurrence time thereof are cleared. Then, as shown in FIG. 4, when the calling arrival is detected by NCU22 and notified to the facsimile device through CCU 23 (step P11), which among the above-mentioned memory receiving functions is set is confirmed (step P12). In the case of not selecting any one of the memory receiving functions, the document of the calling arrival is directly received as it is (step P13).

On the other hand, in the step P2, in case that the selection of the memory receiving function is confirmed, when the occurrence of memory over is not stored in the system memory 13 (step P14 ), and when the memory remaining amount in the image information memory 14 is not below the threshold value (step P21 ), the arriving image information is memory-received (step P18).

In such memory-receiving, as shown in FIG. 7, in the case of ending the signal receiving without causing any memory over, whether there exists the image information to be received is confirmed (step P1). If there exists no image information, the memory receiving is ended. On the contrary, if there exists image information to be received, the received image information is stored in the image information memory 14 (step P2), and further, the memory remaining amount is calculated from the utilized amount of the image information memory 14 and the calculated amount is stored in the system memory 13. (step P3). Next, the memory over does not occur in the image information memory 14 (step P4), for instance, after the first-page image information memory is accumulated in the image information memory, and the procedure returns to the step 11 and similar processings are repeated. And further, after ending the memory receiving, the image information in the image information memory 14 is transferred to the plotter 19 and the same is recorded and outputted therefrom.

On the other hand, in step P4, when the image information of the document of calling arrival is bulky and the occurrence of the memory over in the image information memory 14 is confirmed, the occurrence of memory over and the occurrence time thereof are stored in the system memory 13 (step P15), and further, after notifying the interruption of the signal receiving to CCU 23, the image information in the image information memory 14 is transferred to the plotter portion 19 and the same is recorded and outputted therefrom.

Thereafter, returning to FIG. 6, when the detection of the next calling arrival is notified (step P11), the processing is performed in the same manner as mentioned above. However, in case that the selection of the memory receiving function and the storing of the memory over occurrence are confirmed (steps P12 and P14), the occurrence time of the memory over and the setting time are read out from the system memory 13, and depending on whether, until the present time of RTC 24, the time of setting time (for instance, 5 min.) or more elapses, the necessity of holding the occurrence of memory over is judged (steps P15–P17). When the time does not exceed the set time, since the document after interruption may be retransmitted with high probability without clearing, the procedure advances to the step P13 and the transmitted document is directly received.

On the other hand, when it is judged in step P17 that the time exceeds the set time from the occurrence time of the memory over, since it is possible to judge that the retransmission of the document after the interruption of the transmission from the transmission source, the memory over occurrence thereof is cleared, and the memory receiving is executed (step P18). However, in the case of confirming that the memory remaining amount of the image information memory 14 is not larger than the threshold value in the system memory 13 (step P21), even though the memory receiving is done as it is, it is highly probable that the memory over occurs in the image information memory 14, and the procedure advances to step P13 and the document is directly received as it is in the same manner.

As mentioned heretofore, in the present invention, when the memory receiving function is selected the memory remaining amount of the image information 14 is calculated from the used amount. When the occurrence of the memory over is confirmed, the memory receiving is interrupted and the memory over occurrence is stored in the system memory 13. And then, when the calling arrival occurs thereafter, the memory over is confirmed. In case that the elapsed time from the occurrence of the memory over does not exceed the previously set time, the occurrence of the memory over is not cleared and the received document is directly received. On the contrary, in case that the elapsed time from the occurrence of the memory over exceeds the previously set time, the career of the memory over is cleared and the received document is memory-received. Consequently, even though the image information is put in a state of memory over at the time of previous memory receiving, the image information is automatically received directly and thereby the memory over does not occur again. And further, even though the memory over occurs, the memory receiving function can be effectively utilized after the set time elapses.

And furthers when the calling arrival occurs in case that the memory remaining amount in the memory image information memory 14 is smaller than the threshold value previously set in the system memory 13, the document is directly received even though the memory receiving function is selected. Consequently, the occurrence of the memory over can be prevented before anything happens and the frequency of retransmitting the information by memory receiving decreases.

As a result, the communication time and cost can be also reduced and further it is possible to eliminate a special operation such as turning off the memory receiving function due to the occurrence of the memory over.

Further, it is allowable to clear the memory over occurrence in the system memory 13 after finishing the direct receipt by the predetermined times due to the occurrence of the memory over instead of the elapsed time from the memory over occurrence. Even in such construction, the memory receiving function can be returned and thereby the same functional effect can be obtained. In such situation, the document is not always retransmitted immediately after the interruption of communication due to the memory over. During the time period, there is also a probability of the plural calling arrivals from other parts. Therefore, it is preferable to practice the control of the memory receiving or the direct receiving in accordance with the elapsed time as shown in the present embodiment.

Next, the second embodiment relating to the first, third, or fourth aspects of the present invention is described hereinafter.

At first, the construction thereof is explained.

In FIG. 1, although the facsimile control portion 11 is constructed in almost the same way as that of the above-mentioned first embodiment, in the second embodiment, the transmission source information from RTI (Receiver Terminal Identification) or CSI (Called Subscriber Identification) in the communication controlling procedure is discriminated together with the occurrence of the memory over, and thus discriminated information is stored in the system memory 13. When the detection of the calling arrival by use of NCU22 is notified thereto through CCU 23, the occurrence of the memory over is confirmed and the discriminated transmission source information is compared with the transmission source information stored in the system memory 13. When both coincide with each other, the facsimile control portion 11 judges that the coincidence thereof signifies the retransmission from the transmission source interrupting the transmission of the document, ignores the memory receiving function thus previously set, and practices the direct receiving operation. Namely, an information storing medium is constructed within the system memory 13, and a transmission source discriminating medium and an information comparing medium are constructed within the facsimile control portion 11.

Figure 8:
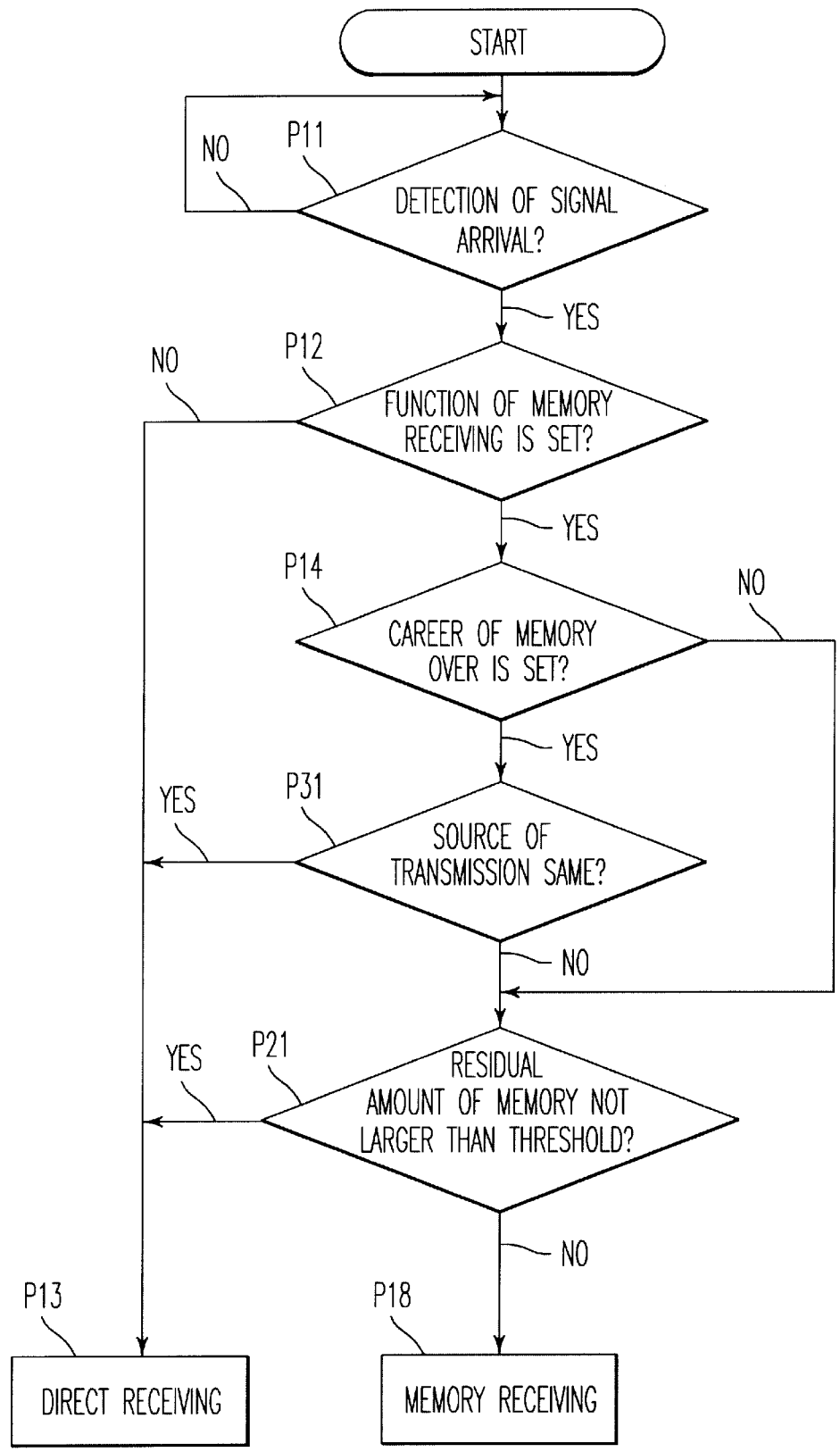
FIG. 8 is a flow chart for explaining the operation of the second embodiment status according to the present invention relating to the first, second, or fourth status thereof.

Next, the operational function thereof is explained referring to FIG. 8. And further, the same step numbers are attached to the same processes as those of the above-mentioned embodiment and the explanation thereof is omitted.

At first, as described in the above-mentioned embodiment, in case that the steps P11 through P18 are performed and either one of the above memory receiving functions is selected, the document of the calling arrival is memory-received. On the contrary, in case that the function is not selected, the document is directly received as it is.

Thereafter, an other calling arrival newly occurs. In the steps P12 and P14, when the selection of the memory receiving function and the operation of storing the memory over occurrence in the system memory 13 are confirmed, the transmission source information stored in the system memory 13 is read out together with the memory over occurrence discriminated at the time of the previous memory receiving, and the read-out information is compared with the transmission source information of the newly-sent document in order to confirm whether both are the same (step P31).

In case that both are the same, the procedure advances to the step P13 and the document is directly received. On the contrary, in case that both are different, the procedure advances to the step P18 through the step P21 and the document is memory-received. Moreover, after finishing the direct receiving of the document from the communication source of the memory over, the memory over occurrence and the transmission information in the system memory 13 are cleared.

Here, before the direct receipt of the retransmitted information is finished and the transmission source information in the system memory 13 is cleared, there probably occurs a possibility of causing the memory over in the image information memory 14 even at the time of memory receiving the documents from the different transmission sources. Therefore, there is provided an area for storing plural transmission source information in the system memory 13. Further, when the memory over occurs in the documents from a number of transmission sources, it is preferable to practice the operation of the above-mentioned first embodiment.

As mentioned heretofore, in the second embodiment, the functional effect as mentioned in the above embodiment can be attained. In addition to that, when the memory over occurs in the image information memory 14, the memory over occurrence is stored together with the discriminated transmission source information in the system memory 13. When a new calling arrival occurs, in case that the transmission source coincides with that stored in the system memory 13, the transmitted document is directly received even though the memory receiving function is selected. Consequently, there occurs no memory over again in the document retransmitted in a state of memory over, and the document is directly received automatically, and the documents transmitted from the other transmission source are memory-received with the selected function. As a result, the memory receiving function can be further effectively utilized.

ADVANTAGEOUS FUNCTIONAL EFFECTS

According to the first aspect of the present invention, since the transmitted image information is memory-received or directly received depending on whether there is stored any information of the memory remaining amount in the image information memory, when the image information is retransmitted due to the memory over, the image information can be directly received without causing the memory over again, and further, the communication time and the communication charge can be reduced. Furthermore, it is possible to eliminate the special operation such as turning off the memory receiving function due to the occurrence of the memory over, or the like. Consequently, the convenience at memory receiving can be improved.

Furthermore, according to the second aspect of the present invention, since the image information transmitted in a state where the memory remaining amount is absent in the image information memory is memory-received or directly received in accordance with the elapsed time, after the image information retransmitted in a state of the memory over is directly received, the image information can be received with the previously set receiving mode. And further, even though a memory over occurs, the memory receiving function can be effectively utilized. Consequently, the convenience thereof can be further improved.

Furthermore, according to the third aspect of the present invention, since the image information transmitted in a state where the memory remaining amount is absent in the image information memory is memory-received or directly received based on a comparison of the transmission source with that of the previous source, only the image information from the transmission source retransmitted in a state of the memory over can be directly received, and the other image information can be received with the receiving mode previously set. Therefore, the memory receiving function can be further effectively utilized even though a memory over occurs. Consequently, the convenience thereof can be further improved.

Furthermore, according to the fourth aspect of the present invention, when the image information is transmitted, since the memory remaining amount in the image information memory is compared with the previously set threshold value and the same is memory-received or directly received, there occurs no retransmission of the image information due to the memory over, the image information can be memory-received or directly received, and thereby the communication cost can be further reduced. And further, it is possible to eliminate the special operation such as turning off the memory receiving function due to the occurrence of the memory over. Consequently, the convenience of operation at the time of the memory receiving can be further improved.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters Patent of the United States Is:

1. A facsimile device capable of operating in a memory receiving mode or a direct receiving mode, comprising:

an image information memory for storing image information;

wherein said facsimile device receives transmitted image information in one of memory receiving mode or direct receiving mode;

remaining amount detecting means for detecting a remaining amount of the image information memory available for data storage;

remaining amount absence detecting means for detecting an absence of the memory remaining amount of said image information memory on the basis of the detected information;

information keeping means for storing information detected by remaining amount detecting means and said remaining amount absence detecting means; and receipt controlling means for controlling memory receipt or direct receipt of said transmitted image information based on the stored information.

2. A facsimile device as defined in claim 1, further comprising:

time measuring means for measuring elapsed time from the moment of detecting the absence of the remaining memory amount by use of said remaining amount absence detecting means;

time comparing means for comparing the elapsed time with a predetermined time period; and said receipt controlling means constructed so as to receive the image information transmitted on the basis of the comparison result in either the memory receiving mode or the direct receiving mode.

3. A facsimile device as defined in claim 1, further comprising:

transmission source discriminating means for discriminating a transmission source of the transmitted image information;

information storing means for storing therein information regarding said transmission source transmitting the image information at the time of said remaining amount absence detecting means detecting the memory amount absence; and information comparing means for comparing information regarding the discriminated transmission source of the discriminated by said transmission source discriminating means with the stored information stored by the information storing means;

said receipt controlling means constructed so as to receive the image information transmitted on the basis of the result of the above comparison in one of said memory receiving mode or said direct receiving mode.

* * * * *